United States Patent [19]

McHale et al.

[11] Patent Number: 5,037,889
[45] Date of Patent: Aug. 6, 1991

[54] RESIN BLENDS EXHIBITING IMPROVED IMPACT PROPERTIES

[75] Inventors: Angelika H. McHale, Mt. Vernon, Ind.; Warren J. Peascoe, West Stockbridge, Mass.

[73] Assignee: General Electric Company, Pittsfield, Mass.

[21] Appl. No.: 464,198

[22] Filed: Jan. 12, 1990

Related U.S. Application Data

[63] Continuation of Ser. No. 209,884, Jun. 22, 1988, Pat. No. 4,902,737, which is a continuation of Ser. No. 945,459, Dec. 23, 1986, abandoned.

[51] Int. Cl.$^5$ .................... C08L 67/02; C08L 69/00
[52] U.S. Cl. ................................. 525/133; 525/148; 525/166; 525/175; 525/176
[58] Field of Search ............... 525/133, 148, 175, 176, 525/166

[56] References Cited

U.S. PATENT DOCUMENTS

| | | | |
|---|---|---|---|
| 2,901,146 | 8/1959 | Kibler et al. | 260/75 |
| 3,028,365 | 4/1962 | Schnell et al. | 260/47 |
| 3,161,615 | 12/1964 | Goldberg | 260/47 |
| 3,169,121 | 2/1965 | Goldberg | 260/47 |
| 3,220,973 | 11/1965 | Goldberg | 260/47 |
| 3,305,520 | 2/1967 | Fritz et al. | 260/45.7 |
| 3,312,659 | 4/1967 | Kurkjy et al. | 260/47 |
| 3,312,660 | 4/1967 | Kurkjy et al. | 260/47 |
| 3,313,777 | 4/1967 | Elam et al. | 260/47 |
| 3,334,154 | 8/1967 | Kim | 260/860 |
| 3,489,716 | 1/1970 | Calkins | 260/45.8 |
| 3,666,614 | 5/1972 | Snedeker et al. | 161/183 |
| 3,839,247 | 10/1974 | Bialous et al. | 260/18 |
| 3,909,490 | 9/1975 | Mark | 260/45.7 |
| 3,917,559 | 11/1975 | Mark | 260/45.7 |
| 3,919,167 | 11/1975 | Mark | 260/45.8 |
| 3,926,908 | 12/1975 | Mark | 260/45.7 |
| 3,931,100 | 1/1976 | Mark | 260/45.7 |
| 3,933,734 | 1/1976 | Mark et al. | 260/45.7 |
| 3,940,366 | 2/1976 | Mark | 260/45.9 |
| 3,944,631 | 3/1976 | Yu et al. | 260/881 |
| 3,948,851 | 4/1976 | Mark | 260/45.8 |
| 3,951,910 | 4/1976 | Mark | 260/45.9 |
| 3,953,396 | 4/1976 | Mark | 260/45.8 |
| 3,953,399 | 4/1976 | Mark | 260/45.85 |
| 3,978,024 | 8/1976 | Mark | 260/45.85 |
| 4,118,370 | 10/1988 | Sannes et al. | 260/45.75 |
| 4,125,572 | 11/1978 | Scott | 260/860 |
| 4,138,379 | 2/1979 | Scott et al. | 260/29.1 |
| 4,148,842 | 4/1979 | Yu et al. | 260/873 |
| 4,156,069 | 5/1979 | Prevorsek et al. | 528/182 |
| 4,238,596 | 12/1980 | Quinn | 528/179 |
| 4,238,597 | 12/1980 | Markezich et al. | 528/179 |
| 4,264,487 | 4/1981 | Fromuth et al. | 260/40 |
| 4,342,846 | 8/1982 | Silberberg | 525/64 |
| 4,522,980 | 6/1985 | Miller | 525/67 |
| 4,636,553 | 1/1987 | Katto et al. | 525/67 |

FOREIGN PATENT DOCUMENTS 0133993 3/1985 European Pat. Off.
53-129246 11/1978 Japan.

*Primary Examiner*—Patricia Short
*Attorney, Agent, or Firm*—Hedman, Gibson, Costigan & Hoare

[57] ABSTRACT

A resin composition comprising:
(i) at least one aromatic carbonate resin;
(ii) at least one polyester resin; and
(iii) an impact improving effective amount of at least one two-phase interpolymer comprised of at least one cross-linked polyacrylate and at least one cross-linked styrene-acrylonitrile resin.

8 Claims, No Drawings

RESIN BLENDS EXHIBITING IMPROVED IMPACT PROPERTIES

This is a continuation of application Ser. No. 07/209,884 filed June 22, 1988, now U.S. Pat. No. 4,902,737 which in turn is a continuation of application Ser. No. 945,459 filed Dec. 23, 1986, now abandoned.

BACKGROUND OF THE INVENTION

Blends of polycarbonate resins and polyester resins are known in the art. For example U.S. Pat. No. 3,128,372 discloses blends of polycarbonates and polyalkylene terephthalates; and U.S. Pat. No. 4,125,572 discloses blends of polycarbonates, poly(1,4-butylene terephthalate) and a copolyester of an aliphatic or cycloaliphatic diol and a mixture of terephthalic acid and isophthalic acid. Polycarbonate/polyester blends exhibit excellent properties which render them useful in the manufacture of film, fibers, and molded articles. They exhibit, for example, better ductility than neat polyesters and better processability than neat polycarbonates. There exist certain situations where polycarbonate/polyester blends exhibiting better impact properties than those possessed by conventional presently available polycarbonate/polyester blends are required.

It is known that the impact properties of neat polycarbonates can be upgraded by combining the polycarbonate resins with impact modifiers. U.S. Pat. No. 4,148,842 to Yu et al. discloses blends of a polycarbonate resin and an interpolymer modifier comprising crosslinked (meth)acrylate, cross-linked styrene-acrylonitrile, and uncrosslinked styrene-acrylonitrile. It is also known that the impact properties of neat polyester resins can be upgraded by combining said polyester resins with an impact modifier. U.S. Pat. No. 4,342,846 discloses blends of a polyester resin, such as polyethylene or polybutylene terephthalate, and an impact resistant interpolymer comprising cross-linked acrylic or methacrylic rubber, cross-linked styrene-acrylonitrile, and uncross-linked styrene-acrylonitrile. This type of impact modifier is described in U.S. Pat. No. 3,944,631 to Yu et al. as being a three stage interpolymer produced in a three stage polymerization process in which in the third stage a cross-linked acrylate/cross-linked styrene-acrylonitrile polymeric material is used as a reaction ingredient during the polymerization of styrene and acrylonitrile without a cross-linking agent.

It has now been discovered that a two phase material, i.e., a cross-linked acrylate/cross-linked styrene-acrylonitrile, produced by a two stage polymerization procedure, can be utilized as an effective impact modifier for blends of thermoplastic aromatic carbonate resins/polyester resins. The use of this two phase interpolymer comprised of a cross-linked elastomeric acrylate and a cross-linked styrene-acrylonitrile is thus a departure from known techniques described in the prior art. For example, in the aforediscussed U.S. Pat. Nos. 3,944,631, 4,148,842 and 4,342,846, three stage polymerizations yielding a three phase interpolymer comprised of a cross-linked acrylate/cross-linked styrene-acrylonitrile/uncross-linked or linear styrene-acrylonitrile, rather than a two stage polymerization yielding a two phase interpolymer followed by a blending step, are advocated.

The fact that the two phase cross-linked acrylate/cross-linked styrene-acrylonitrile interpolymer can be used effectively in a blend of aromatic carbonate resins and polyester resins as an impact modifier is generally surprising and unexpected. In order for a material to function as an effective impact modifier for thermoplastic resins it must not only improve the impact properties of these resins, but it must also be compatible with the resins, i.e., it must not deleteriously affect the advantageous properties of these resins. Furthermore, it must readily be combinable with the resin over the range of concentrations which are effective to improve the impact properties of these resins. While some materials are effective in positively upgrading the impact properties of certain resins they do so only at the cost of deleteriously affecting some of the other advantageous properties of said resins. While other materials function as impact modifiers for certain resins and do not significantly deleteriously affect substantially most of the advantageous properties of these resins they are not readily combinable with these resins. Still other materials need be present in relatively large concentrations in order to significantly positively upgrade the impact properties of these resins.

This area of impact modification of various resins by blending them with various compounds which function as impact modifiers is thus still an art rather than an exact science wherein the empirical approach is still generally the rule rather than an exception. This is particularly true when dealing with blends of two different resins, wherein the aforediscussed problems are greatly magnified.

Thus, the fact that the instant two phase interpolymers function as effective impact modifiers for blends of aromatic carbonate resins and polyester resins, are compatible with these blends, positively upgrade the impact properties of the blends at relatively low loadings, and are readily combinable with these blends, is one which could not be predicted and is unexpected.

SUMMARY OF THE INVENTION

Aromatic carbonate resin/polyester resin blends exhibiting improved impact properties are provided by adding to said blends an effective amount of an impact modifier which is a two phase interpolymer comprised of a first elastomeric phase of a cross-linked polyacrylate and a second phase comprised of a cross-linked styrene-acrylonitrile.

DETAILED DESCRIPTION OF THE INVENTION

The instant compositions are comprised of (i) a blend of at least one aromatic carbonate resin and at least one polyester resin; and (ii) an amount effective to improve the impact properties of said blend of a two-phase interpolymer comprised of a cross-linked polyacrylate and a crosslinked styrene-acrylonitrile said interpolymer being free of linear or non-cross-linked styrene-acrylonitrile, the two phases being joined by an inter-penetrating network between the two phases.

The aromatic carbonate resins of the instant invention include the polycarbonate resins and the copolyestercarbonate resins. The polycarbonate resins are conventional and well known thermoplastic resins which are generally commercially available or may be readily prepared by known methods. These polycarbonates, as well as methods for their preparation, are described, inter alia, in U.S. Pat. Nos. 3,161,615; 3,220,973; 3,312,659; 3,312,660; 3,313,777; 3,666,614 and 3,393,672, all of which are incorporated herein by reference. The polycarbonates may be prepared by a variety of known methods, including the interfacial polymerization process which involves the coreaction of at least one dihydric phenol and a carbonate precursor. The polycarbonate resins contain at least one recurring structural unit represented by the general formula

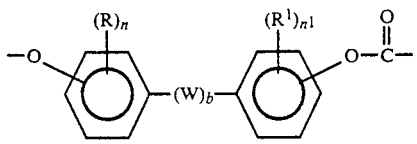

wherein:
R and $R^1$ are independently selected from monovalent hydrocarbon radicals, monovalent hydrocarbonoxy radicals, and halogen radicals;
W is selected from divalent hydrocarbon radicals,

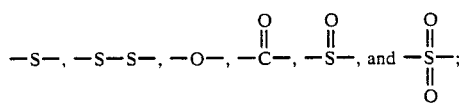

n and $n^1$ are independently selected from integers having a value of from 0 to 4 inclusive; and b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from about 4 to about 8 ring carbon atoms. The preferred aryl radicals are those containing from 6 to 12 ring carbon atoms, i.e., phenyl, biphenyl, and naphthyl. The preferred aralkyl and alkaryl radicals are those containing from 7 to about 14 carbon atoms.

The preferred halogen radicals represented by R and $R^1$ are chlorine and bromine.

The monovalent hydrocarbonoxy radicals represented by R and $R^1$ may be represented by the formula —OR' wherein R' is a monovalent hydrocarbon radical of the type described hereinafore. Preferred hydrocarbonoxy radicals are the alkoxy and aryloxy radicals.

The divalent hydrocarbon radicals represented by W include the alkylene, alkylidene, cycloalkylene, and cycloalkylidene radicals. The preferred alkylene radicals are those containing from 2 to about 20 carbon atoms. The preferred alkylidene radicals are those containing from 1 to about 20 carbon atoms. The preferred cycloalkylene and cycloalkylidene radicals are those containing from 6 to about 16 ring carbon atoms.

Typically, the dihydric phenols utilized in the preparation of the polycarbonate resins may be represented by the general formula

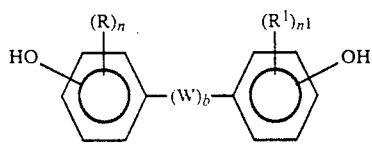

wherein R, $R^1$, n, $n^1$, W and b are as defined hereinafore.

Some illustrative non-limiting examples of dihydric phenols falling within the scope of Formula II include:
2,2-bis(4-hydroxyphenyl) propane (bisphenol-A);
2,2-bis(3,5-dibromo-4-hydroxyphenyl) propane;
2,2-bis(3,5-dimethyl-4-hydroxyphenyl) propane;
2,2-bis(3-bromo-5-methyl-4-hydroxyphenyl) propane;
1,1-bis(4-hydroxyphenyl) cyclohexane;
1,1-bis(4-hydroxyphenyl) cyclododecane;
1,1-bis(3,5-dimethyl-4-hydroxyphenyl) cyclododecane;
1,1-bis(4-hydroxyphenyl) decane;
1,4-bis(4-hydroxyphenyl) butane;
bis(4-hydroxyphenyl) methane;
4,4'-thiodiphenol; and
bis(4-hydroxyphenyl) ether.

Other phenols which are useful are described in U.S. Pat. Nos. 2,998,835; 3,028,365 and 3,334,154, all of which are incorporated herein by reference.

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl) carbonates such as di(bromophenyl) carbonate, di(chlorophenyl) carbonate, and di(tribromophenyl)carbonate: di(alkylphenyl)carbonates such as di(tolyl)carbonate; di(naphthyl) carbonate; chlorophenyl chloronaphthyl carbonate; and phenyl tolyl carbonate. The bishaloformates that can be used include the bishaloformates of dihydric phenols such as the bischloroformates of bisphenol-A and hydroquinone; and the bishaloformates of glycols such as the bischloroformates of ethylene glycol, neopentyl glycol, and polyethylene glycol. The preferred carbonate precursor is carbonyl chloride, also known as phosgene.

Among the processes used for the preparation of the polycarbonates are the pyridine process, the interfacial polymerization process, transesterification, and melt polymerization. A convenient process for the preparation of the polycarbonate resins is the interfacial polymerization process. This process utilizes two different solvent media which are immiscible. One solvent medium is an aqueous basic medium. The other solvent medium is an organic medium such as methylene chloride which is immiscible with said aqueous medium. Also employed in the interfacial polymerization process are molecular weight regulators which control the chain length or molecular weight of the polycarbonate by a chain terminating mechanism, and catalysts. The molecular weight regulators are well known in the art and include, but are not limited to, phenyl itself, p-tertiarybutyl phenol, and chroman-I. The catalysts are also well known in the art and include, but are not limited to, tertiary amines such as triethylamine, quaternary ammonium compounds such as tetraethylammonium bromide, and quaternary phosphonium compounds such as n-butyltriphenyl phosphonium.

Also included within the scope of the term polycarbonates are the randomly branched thermoplastic polycarbonates wherein a branching agent, which is generally a polyfunctional aromatic compound, is reacted with the dihydric phenol and the carbonate precursor. These polyfunctional aromatic compounds are used in minor amounts, i.e., amount effective to provide branching, and contain at least three functional groups which may be carboxyl, hydroxyl, carboxylic anhydride, haloformyl, and mixtures thereof. Some illustrative non-limiting examples of these aromatic polyfunctional compounds which may be employed as branching agents include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, and benzophenonetetracarboxylic acid.

The copolyester-carbonate resins are well known in the art and are described along with methods for their preparation in U.S. Pat. Nos. 3,169,121; 4,238,596; 4,156,069 and 4,238,597, all of which are incorporated herein by reference.

Briefly stated the high molecular weight thermoplastic aromatic copolyester-carbonates comprise recurring carbonate groups, carboxylate groups, and aromatic carbocylic groups in the polymer chain in which at least some of the carbonate groups and at least some of the carboxylate groups are bonded directly to the ring carbon atoms of the aromatic carbocyclic groups. These copolyester-carbonates contain ester bonds and carbonate bonds in the chain, wherein the amount of the ester bonds is in the range of from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

These copolyester-carbonates may be readily prepared by the interfacial polymerization process by the reaction of (i) at least one dihydric phenol, (ii) a carbonate precursor, and (iii) an ester precursor. The dihydric phenols and the carbonate precursors are of the type described hereinafore. The ester precursor may be a difunctional carboxylic acid or, preferably, its ester forming reactive derivative such as an acid dihalide, e.g., isophthaloyl dichloride, terephthaloyl dichloride, and mixtures thereof. Some useful difunctional acids are set forth in U.S. Pat. No. 3,169,121. The polyesters may be either aliphatic, aromatic, or aliphatic-aromatic in character. The polyesters are characterized in that they have recurring ester units in the polymer chain, i.e., carboxylate groups bonded to a carbon atom of a hydrocarbon or substituted hydrocarbon radical.

The preferred polyesters for use in the instant invention generally contain at least one recurring structural unit represented by the general formula:

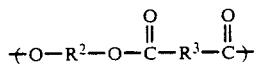
III wherein $R^2$ and $R^3$ are independently selected from divalent hydrocarbon radicals or substituted divalent hydrocarbon radicals.

In the case of aliphatic polyesters both $R^2$ and $R^3$ are independently selected from divalent aliphatic hydrocarbon radicals or substituted divalent aliphatic hydrocarbon radicals. The divalent aliphatic hydrocarbon radicals include the alkylene, alkenylene, alkylidene, cycloalkylene, cycloalkylidene, and cycloalkenylene radicals. Preferred alkylene radicals are those containing from 2 to about 20 carbon atoms. The preferred alkylidene radicals are those containing from 1 to about 20 carbon atoms. The preferred alkenylene radicals are those containing from 2 to about 20 carbon atoms. The preferred cycloalkylene, cycloalkylidene, and cycloalkenylene radicals are those containing from about 4 to about 8 ring carbon atoms. The substituted divalent aliphatic hydrocarbon radicals are those divalent aliphatic hydrocarbon radicals described above which contain at least one substituent group, preferably from one to about three substituent groups. The preferred substituent groups are the halogens, nitro groups, and amino groups.

The aromatic polyesters suitable for use in the instant invention generally contain at least one recurring structural unit of Formula III wherein $R^2$ and $R^3$ are independently selected from divalent aromatic radicals or substituted divalent aromatic radicals. The divalent aromatic radicals represented by $R^2$ and $R^3$ include the phenylene radical, the substituted phenylene radical, the biphenylene radical, the substituted biphenylene radical, the naphthylene radical, the substituted naphthylene radical, and radicals represented by the general formula

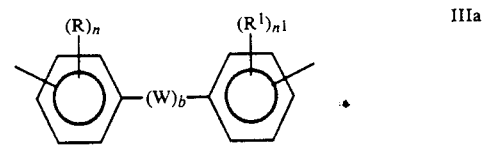
IIIa wherein $R$, $R^1$, $W$, $n$, $n^1$ and $b$ are as defined hereinafore.

Particularly useful aromatic polyesters are those wherein $R^3$ is a phenylene radical and $R^2$ is a radical represented by Formula IIIa.

The aliphatic aromatic polyesters are those wherein one of $R^2$ or $R^3$ is a divalent aromatic radical and one of $R^2$ or $R^3$ is a divalent aliphatic radical. Preferred aliphatic aromatic polyesters are those wherein $R^2$ is a divalent aliphatic radical or substituted divalent aliphatic radical and $R^3$ is a divalent aromatic radical or a substituted divalent aromatic radical.

One class of particularly useful aliphatic aromatic polyesters are the polyalkylene terephthalates or polyalkylene isophthalates. These types of polyesters contain at least one recurring structural unit represented by the general formula

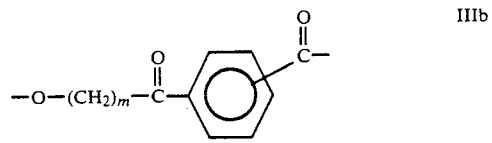
IIIb wherein m is an integer having a value of from 2 to about 4 inclusive. Especially preferred polyesters of Formula IIIb are polyethylene terephthalate and poly(1,4-butylene terephthalate).

Another class of particularly useful aliphatic aromatic polyesters are polyester copolymers or copolyesters which can, without limitation, comprise the reaction products of: (a) a glycol portion comprising a 1,4-cyclohexanedimethanol with an acid portion comprising terephthalic acid, isophthalic acid or mixtures thereof; or (b) a glycol portion comprising a 1,4-cyclohexanedimethanol and ethylene glycol wherein the molar ratio of the 1,4-cyclohexanedimethanol to the ethylene glycol in the glycol portion is from about 4:1 to about 1:4, with an acid portion comprising terephthalic acid, isophthalic acid, or mixtures thereof.

These types of copolyesters may be prepared by procedures well known in the art, such as by condensation reactions substantially as shown and described in U.S. Pat. No. 2,901,466, which is hereby incorporated by reference. More particularly, the acid or mixtures of acids or alkyl esters of the aromatic dicarboxylic acid or acids, for example, dimethylterephthalate, together with the dihydric alcohols are charged to a flask and heated to a temperature sufficient to cause condensation of the copolymer to begin, for example 175°–225° C. Thereafter the temperature is raised to about 250° to 300° C., and a vacuum is applied and the condensation reaction is allowed to proceed until substantially complete.

The condensation reaction may be facilitated by the use of a catalyst, with the choice of catalyst being determined by the nature of the reactants. The various catalysts for use herein are very well known in the art and are too numerous to mention individually. Generally, however, when an alkyl ester of the dicarboxylic acid is employed, an ester interchange type of catalyst is preferred. If a free acid is being reacted with free glycols, a catalyst is generally not added until after the preliminary condensation has gotten under way.

The reaction is generally begun in the presence of an excess of glycols and initially involves heating to a temperature sufficient to cause a preliminary condensation followed by the evaporation of excess glycol. The entire reaction is conducted with agitation under an inert atmosphere. The temperature can be advantageously increased with or without the immediate application of vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well known techniques. Thus, the highly monomeric condensation product can be cooled, comminuted, and heated to a temperature below its melting point, thereby avoiding coagulation of the solid particles. The solid phase polymerization is conducted until the desired degree of polymerization is achieved. The solid phase polymerization, among other things, results in a higher degree of polymerization without the accompanying degradation which frequently takes place when continuing the last stage of the melt polymerization at a temperature high enough to achieve the desired degree of polymerization. The solid phase process is advantageously conducted with agitation employing an inert atmosphere at either normal atmospheric pressure or under greatly reduced pressure.

These copolyesters will generally have an intrinsic viscosity of at least about 0.4 dl/gm as measured in 60/40 phenol/tetrachloroethane or other similar solvents at about 25° C. and will have a heat distortion temperature at 264 p.s.i. from about 60° C. to about 70° C. The relative amounts of the 1,4-cyclohexanedimethanol to ethylene glycol in the glycol portion of the copolyester (b) may vary so long as the molar ratio of 1,4-cyclohexanedimethanol to ethylene glycol is from about 1:4 to 4:1, in order to provide a polyester copolymer having a suitable heat distortion temperature within the recited range, and other suitable properties.

One quite useful type of copolyester is a copolyester of the type described hereinafore wherein the glycol portion has a predominance of ethylene glycol over 1,4-cyclohexanedimethanol, for example greater than about 50/50 and especially preferably is about 70 molar ethylene glycol to 30 molar 1,4-cyclohexanedimethanol, and the acid portion is terephthalic acid. A preferred copolyester of this type is commercially available under the tradename KODAR PETG 6763 from Eastman Chemical Co. A preferred copolyester is one derived from 1,4-cyclohexanedimethanol as the glycol portion and a mixture of isophthalic and terephthalic acids as the acid portion. This type of copolyester is available from Eastman Chemical Co. under the tradename KODAR A150.

The ratios of the polyesters to the polycarbonates in the instant compositions may vary widely. Generally, however, compositions which contain from about 2 to about 98 weight percent of the aromatic carbonate resin and from about 98 to about 2 weight percent polyester are preferred, while compositions which contain from about 5 to about 95 weight percent aromatic carbonate resin and from about 95 to about 5 weight percent polyester resin are more preferred. Quite useful compositions are those that contain from about 10 to about 90 weight percent aromatic carbonate resin and from about 90 to about 10 weight percent polyester resin. Weight percent aromatic carbonate resin is based on the total amounts of aromatic carbonate resin and polyester resin present in the compositions. Likewise, weight percent polyester is based on the total amounts of the polyester resins and aromatic carbonate resin present in the instant compositions, i.e., polyester/aromatic carbonate blends. The impact modifier of the present invention is a two phase interpolymer containing a first elastomeric phase comprising a cross-linked polyacrylate and a second phase comprising a cross-linked styrene-acrylonitrile. The two phases are joined and held together by an interpenetrating network of the cross-linked acrylate and the cross-linked styrene-acrylonitrile. The integrity of the two phases is generally maintained by mechanical means such as interpenetration and entanglement of the two cross-linked components rather than by chemical means such as grafting or graft-linking of the two components. Thus, the interpolymer is substantially free or contains little if any grafting or graft-linking. The instant two phase interpolymer is also free of any added non-crosslinked or linear styrene-acrylonitrile. This is a sharp contrast to the interpolymer described in U.S. Pat. No. 3,944,631 which contains a noncross-linked or linear styrene-acrylonitrile.

These two phase interpolymer compositions may be formed by the following type of two-step sequential polymerization process:

1. emusion polymerizing an acrylate monomer charge (herein designated "acrylate" for the purposes of the present invention) of at least one $C_2$–$C_{10}$ alkyl acrylate, $C_8$–$C_{22}$ alkyl methacrylate, or compatible mixtures thereof, in an aqueous polymerization medium in the presence of an effective amount, e.g., from about 0.05 to about 10 percent by weight, or a di- or polyfunctional ethylenically unsaturated cross-linking agent for such types of monomers to form an aqueous latex of cross-linked acrylic elastomeric particles;

2. emulsion polymerizing a charge of styrene and acrylonitrile monomers in an aqueous polymerization medium, also in the presence of an effective amount of a suitable di- or polyfunctional ethylenically unsaturated cross-linking agent, said polymerization being carried out in the presence of the product of step 1, so that the cross-linked acrylic resin and the cross-linked styrene-acrylonitrile components form an interpolymer wherein the respective phases interpenetrate.

Such a two stage polymerization process is analogous to the three stage process described in U.S. Pat. No. 3,944,631 to Yu, incorporated herein by reference, except for the fact that this two stage process does not include the critical third stage of Yu which involves adding a monomeric charge of styrene and acrylonitrile which does not contain a cross-linking agent to form a linear non-cross-linked styrene-acrylonitrile polymer. In other respects steps 1 and 2 are the same as described in U.S. Pat. No. 3,944,631.

The acrylic elastomers used in preparing the interpolymer of the instant invention comprise cross-linked acrylic polymers or copolymers having a Tg, i.e., a glass transition temperature, of below about 25° C. which can be polymerized by means of free radical initiated emulsion techniques. The acrylic elastomers are cross-linked during the polymerization of the elastomer by the inclusion of a polyfunctional ethylenically unsaturated monomer cross-linking agent in the polymerization mixture.

The preferred acrylate monomers are the $C_4$–$C_8$ alkyl acrylate monomers such as n-butyl acrylate, ethyl acrylate, and 2-ethylhexyl acrylate. If desired, the monomer charge may contain small amounts, i.e., 1–20% by weight of the amount of acrylate monomer, of optional monomers such as styrene, acrylonitrile, methacrylonitrile, methyl methacrylate, methacrylic acid, acrylic acid, vinylidene chloride, vinyl toluene and any other ethylenically unsaturated monomer copolymerizable with the acrylate monomer selected for use.

It is to be understood that the term "acrylate" and "acrylic" as used herein includes both the acrylates, i.e., alkyl acrylates, and methacrylates, i.e., alkyl methacrylates.

The interpolymer of the present invention generally comprises from about 40 to about 90 percent by weight of at least one of the cross-linked acrylates, and from about 10 to about 60 percent by weight of said cross-linked styrene-acrylonitrile. Preferably the interpolymer will comprise from about 50 to about 90 weight percent of said cross-linked acrylate and from about 20 to about 50 weight percent of said cross-linked styrene-acrylonitrile. Weight percent is calculated based on the total amounts of said cross-linked acrylate and said cross-linked styrene-acrylonitrile present in the interpolymer.

In contradistinction to the three phase interpolymer described in U.S. Pat. No. 3,944,631, the instant two phase polymer does not contain any added non-cross-linked styrene-acrylonitrile copolymer which is obtained by the polymerization of styrene and acrylonitrile monomers in the absence of any cross-linking agent. While it is possible that some minor amounts of uncross-linked styrene-acrylonitrile may be present from the second polymerization and cross-linking step described hereinafore, this uncross-linked styrene-acrylonitrile is present only as a trace impurity and not as one of the components of the instant two phase interpolymer. That is to say, this non-cross-linked or linear styrene-acrylonitrile is present due to any incomplete cross-linking reaction of step 2. Thus the term "substantially free of linear or non-cross-linked styrene-acrylonitrile" means that the instant interpolymer does not contain any additional or added non-cross-linked styrene-acrylonitrile above and beyond that which may remain as an inherent impurity or unreacted reactant of step 2. That is to say, the instant interpolymer does not contain a third phase comprised of a linear or non-cross-linked styrene-acrylonitrile as does the three phase composition of the aforediscussed Yu patent.

The amount of the instant two phase interpolymer present in the instant compositions is an amount which is at least effective to improve the impact properties, e.g., impact strength, of the aromatic carbonate resin/polyester resin blends. Generally, this amount is from about 1 to about 30 weight percent, preferably from about 3 to about 25 weight percent, and more preferably from about 4 to about 20 weight percent. Weight percent of impact modifier is based on the total of impact modifier and blend of aromatic carbonate resin/polyester resin present.

Generally, if less than about 1 weight percent of impact modifier is present in the instant compositions there is no appreciable improvement in the impact properties of the aromatic carbonate/polyester blends. In general, if the instant compositions contain more than about 30 weight percent of said impact modifiers than the advantageous properties of said blends will be substantially adversely affected, i.e., the compositions will begin to loose, to a substantial degree, the advantageous physical properties imparted thereto by the aromatic carbonate/polyester blends. Thus, the instant compositions contain an amount of said impact modifier effective to improve or positively upgrade the impact properties of the blends but insufficient to substantially deleteriously affect substantially most of the advantageous physical properties of said blends.

The compositions of the instant invention may be prepared by any of the known and conventional means. For example, the instant compositions may be prepared by first compounding the aromatic carbonate/polyester blends and then mixing with said precompounded blends the appropriate amount of the impact modifier of the instant invention. Alternately, the aromatic carbonate resin, the polyester resin, and the impact modifier can be mixed together without first precompounding the aromatic carbonate/polyester blends.

The compositions of the instant invention may also optionally contain other commonly known and used additives such as, for example, antioxidants; mold release agents; ultraviolet radiation stabilizers; hydrolytic stabilizers such as the epoxides disclosed in U.S. Pat. Nos. 3,489,716; 4,138,379, and 3,839,247; color stabilizers such as the organophosphites disclosed in U.S. Pat. Nos. 3,305,520 and 4,118,370; fillers such as talc, clay, mica and glass such as glass particles or chopped fiberglass: other commonly known and used impact modifiers such as those described in U.S. Pat. No. 4,512,980 to Miller, incorporated herein by reference: and flame retardants.

Some useful flame retardants include the alkali and alkaline earth metal salts of organic sulfonic acids. These types of flame retardants are disclosed, inter alia, in U.S. Pat. Nos. 3,933,734; 3,948,851; 3,926,908; 3,919,167; 3,909,490; 3,953,396; 3,931,100; 3,978,024; 3,953,399; 3,917,559; 3,951,910 and 3,940,366.

Other useful flame retardants include the well known inorganic and organic sulfur and/or halogen containing compounds such as, for example, the halogenated, e.g., brominated, polycarbonate oligomers or polymers, used either alone or in combination with antimony oxide.

As mentioned hereinafore the compositions of the instant invention may optionally contain glass filler. The glass may be in the form of small glass particles or spheres or glass fibers. By glass fibers it is to be understood that glass silk as well as all glass fiber materials derived therefrom including but not limited to glass fiber fabrics, roving, staple fibers, and glass fiber mats are included. The length of the glass filaments and whether or not they are bundled into fibers and the fibers bundled in turn to yarns, ropes, or rovings, or woven into mats and the like, are not critical. However, when using fibrous glass filaments, they may first be formed and gathered into a bundle known as a strand. In order to bind the filaments into a strand, a binder or binding agent may be applied to the glass filaments. This facilitates the handling of the strands. The strands can be chopped into various lengths, preferably from about ⅛" to about 1" long, more preferably less than ½" long, and most preferably about ¼" long. The compositions generally contain up to about 50 weight % of glass filler, preferably up to about 30 weight % glass filler, based on the amounts of glass filler, resin, and modifier present.

PREFERRED EMBODIMENT OF THE INVENTION

The following examples are presented to more fully and clearly illustrate the present invention. The examples are intended to be considered as illustrative of the invention rather than in a limiting sense. In the examples all parts and percentages are on a weight basis unless otherwise indicated.

The following example illustrates the preparation of the two-phase cross-linked acrylate/cross-linked styrene acrylonitrile interpolymer of the instant invention.

EXAMPLE 1

A 7,500 liter stainless steel reactor was charged with 5,488 liters of deionized water. With the agitator set at 55 rpm, the following ingredients were charged in order of their listing.

| Ingredient | Amount |
| --- | --- |
| Sodium lauryl sulfate emulsifier solution (30 wt. % active) | 15.77 kg. |
| Disodium monodecyl sulfosuccinate emulsifier solution (50 wt. % active) | 31.81 kg. |
| Sodium bisulfite buffer in deionized water | 2.09 kg. 6.1 liters |
| n-butyl acrylate monomer premixed with butylene glycol diacrylate cross-linker | 1,112 kg 1.89 kg |

The reactor was purged of air by alternately pressurizing the reactor to 0.703 kg/cm$^2$ with nitrogen and then venting to 0.141 kg/cm$^2$. This purge cycle was repeated three times. The reactor was heated to 54.4° C. At this time 2.09 kg of ammonium persulfate in 6.1 liters of deionized water was added. The batch temperature was held close to 54.4° C. by an automatic temperature control system supplying cooling to the reactor jacket. The batch was allowed to react for 2 hours.

At the end of the 2 hour reaction time the following ingredients were charged:

| Ingredient | Amount |
| --- | --- |
| N-butyl acrylate monomer premixed with | 4,458 kg |
| butylene glycol diacrylate crosslinker | 7.58 kg |
| Ammonium persulfite initiator in | 5.70 kg |
| deionized water | 11.4 liters |
| Sodium bisulfite buffer | 2.25 kg |

| Ingredient | Amount |
| --- | --- |
| in deionized water | 3.8 liters |

The reactor was then purged by alternately pressurizing to 0.703 kg/cm$^2$ with nitrogen and venting to 0.141 kg/cm$^2$ three times. The batch was allowed to react for an additional 3.25 hours with the temperature control system set at 54.4° C.

At the end of the 3.25 hour reaction time the following premixed solution was charged into the reactor with the agitator turned off:

| Ingredient | Amount |
| --- | --- |
| Styrene monomer | 1357 kg |
| Acrylonitrile monomer | 500 kg |
| Divinyl benzene (55 wt % active) | 19.63 kg |

Immediately after charging the above solution agitation was resumed at 55 rpm. The batch was allowed to react for 3.5 hours at 54.4° C.

At the end of the 3.5 hour reaction period, 1.5 kg of ascorbic acid in 11.4 liters of deionized water was added. The batch was then cooled and transferred through a strainer to a hold tank. Less than 10 kg of undesired polymer coagulum was found in the strainer.

To the strained material there was added methanol (equal parts by weight of methanol) and 0.5 wt. % of calcium chloride. The resultant coagulum was filtered, washed with water, and dried in a vacuum oven.

The following examples illustrate compositions falling outside the scope of the instant invention they are presented for comparative purposes only.

EXAMPLE 2

This example illustrates a blend of a polycarbonate and a polyester resin.

To 15 parts by weight of an aromatic polycarbonate resin (derived from bisphenol-A and phosgene-LEXAN ® resin, grade 131, sold by the General Electric Company) there are added 70 parts by weight of poly(butylene terephthalate) (VALOX ® resin. grade 315, marketed by the General Electric Company), 0.3 parts by weight of a color stabilizer, and 0.15 parts by weight of a thermal stabilizer. The resultant mixture is extruded and molded into sample parts ⅛" thick. These test samples are subjected to the notched Izod impact strength test performed in accordance with ASTM D-256. The results are set forth in Table I.

EXAMPLE 3

This example illustrates a flame retardant blend of a polycarbonate and a polyester resin.

To 2 parts by weight of an aromatic polycarbonate resin (derived from bisphenol-A and phosgene-LEXAN ® resin, grade 101, sold by the General Electric Company) there are added 65.75 parts by weight of poly(butylene terephthalate) (VALOX ® resin, grade 315, sold by the General Electric Company), 26 parts by weight of brominated polycarbonate resin (derived from brominated bisphenol-A and phosgene, and having a bromine content of 26 weight percent), 5.2 parts by weight of antimony oxide, 0.15 parts by weight of thermal stabilizer, and 1.9 parts by weight of ethylene vinyl acetate. The resultant mixture is extruded and molded into sample parts ⅛" thick. The notched Izod of these parts is determined in accordance with the procedure of Example 2 and the results are set forth in Table I.

EXAMPLE 4

This example illustrates a glass filled polycarbonate/polyester blend.

To 14 parts by weight of an aromatic polycarbonate resin (derived from bisphenol-A and phosgene-LEXAN® resin, grade 121, sold by the General Electric Company) there are added 55.55 parts by weight of poly(butylene terephthalate) resin (VALOX® resin, grade 295, sold by the General Electric Company), 30 parts by weight of glass fiber, 0.3 parts by weight of color stabilizer, and 0.15 parts by weight of thermal stabilizer. The resultant mixture is extruded and molded into test sample parts ⅛" thick. The notched Izod of these test samples is determined in accordance with the procedure of Example 2 and the results are set forth in Table I.

The following examples illustrate the compositions of the present invention.

EXAMPLE 5

To 15 parts by weight of the polycarbonate resin used in Example 2 are added 70 parts by weight of the poly(butylene terephthalate) used in Example 2, 15 parts by weight of the two phase interpolymer prepared substantially in accordance with the procedure of Example 1, 0.3 parts by weight of the color stabilizer of Example 2, and 0.15 parts by weight of the thermal stabilizer of Example 2. The resultant mixture is extruded and molded into test sample parts of ⅛" thickness. The notched Izod of these parts is determined in accordance with the procedure of Example 2 and the results are set forth in Table I.

EXAMPLE 6

This example illustrates a flame retardant blend of polycarbonate/polyester containing the two phase interpolymer of the present invention.

To 15 parts by weight of polycarbonate resin (LEXAN® resin, grade 131, sold by the General Electric Company), there are added 36.05 parts by weight of poly(butylene terephthalate) resin (VALOX® resin, grade 315, sold by the General Electric Company), 29 parts by weight of the brominated polycarbonate resin of Example 3, 0.1 parts by weight of the color stabilizer of Example 3, 0.15 parts by weight of the thermal stabilizer of Example 3, 1.3 parts by weight of ethylene vinyl acetate, 5.4 parts by weight of antimony oxide, and 13 parts by weight of the the two phase interpolymer prepared substantially in accordance with the procedure of Example 1. The resultant mixture is extruded and molded into test sample parts of ⅛" thickness. The notched Izod of these parts is determined in accordance with the procedure of Example 2 and the results are set forth in Table I.

EXAMPLE 7

This example illustrates a glass filled blend of polycarbonate/polyester containing the two phase interpolymer of the present invention.

To 15 parts by weight of aromatic polycarbonate resin used in Example 4 are added 39.55 parts by weight of the poly(butylene terephthalate) resin used in Example 4, 0.15 parts by weight of the thermal stabilizer used in Example 4, 0.3 parts by weight of the color stabilizer used in Example 4, 30 parts by weight of the ⅛" long chopped fiberglass used in Example 4, and 15 parts by weight of the two phase interpolymer prepared substantially in accordance with the procedure of Example 1. The resultant mixture is extruded and molded into test sample parts measuring ⅛" thick. The notched Izod of these test parts is determined in accordance with the procedure of Example 2 and the results are set forth in Table I.

TABLE I

| Example No. | Interpolymer (wt. %) | Notched Izod (ft. lb./in) |
|---|---|---|
| 2 | 0 | 1 |
| 3 | 0 | 0.7 |
| 4 | 0 | 1.6 |
| 5 | 15 | 12 |
| 6 | 13 | 12 |
| 7 | 15 | 3.4 |

As illustrated by the data in Table I the compositions of the instant invention (Examples 5–7) exhibit improved impact strengths over comparable compositions which do not contain any of the two phase interpolymer of the present invention (Examples 2–4). The composition of Example 2 should be compared with the composition of Example 5; the composition of Example 3 should be compared with the composition of Example 6; and the composition of Example 4 should be compared with the composition of Example 7.

The compositions of the instant invention are useful for the preparation of molded and extruded articles.

It is to be understood that changes may be made in the particular embodiments of the invention described herein which are within the full intended scope of the invention as defined by the appended claims.

What is claimed is:

1. A process for improving the impact properties of a blend of at least one aromatic carbonate resin and at least one polyester resin comprising admixing said blend with an amount effective to improve the impact properties of said blend of a two-phase interpolymer free of non-cross-linked or linear styrene-acrylonitrile polymer and free of any grafting or graft-linking comprised of the polymerized and cross-linked reaction products of at least one $C_2$–$C_{10}$ alkyl acrylate monomer, at least one $C_8$–$C_{22}$ alkyl methacrylate monomer, or mixtures thereof, and a cross-linked styrene-acrylonitrile resin second phase.

2. The process of claim 1 wherein said alkyl acrylate monomer is a $C_4$–$C_6$ alkyl acrylate monomer.

3. The process of claim 2 wherein said alkyl acrylate monomer is butyl acrylate.

4. The process of claim 1 wherein said interpolymer is comprised of from about 40 to about 90 weight percent of said cross-linked polyacrylate first phase and from about 10 to about 60 weight percent of said styrene-acrylonitrile resin second phase.

5. The process of claim 4 wherein said interpolymer is comprised of from about 50 to about 80 weight percent of said cross-linked polyacrylate first phase and from about 20 to about 50 weight percent of said cross-linked styrene-acrylonitrile second phase.

6. The process of claim 1 which comprises admixing from about 1 to about 30 weight percent of said interpolymer with said blend.

7. The process of claim 6 which comprises admixing from about 3 to about 25 weight percent of said interpolymer with said blend.

8. The process of claim 1 which comprises admixing from about 4 to about 20 weight percent of said interpolymer with said blend.

* * * * *